Figure 1:
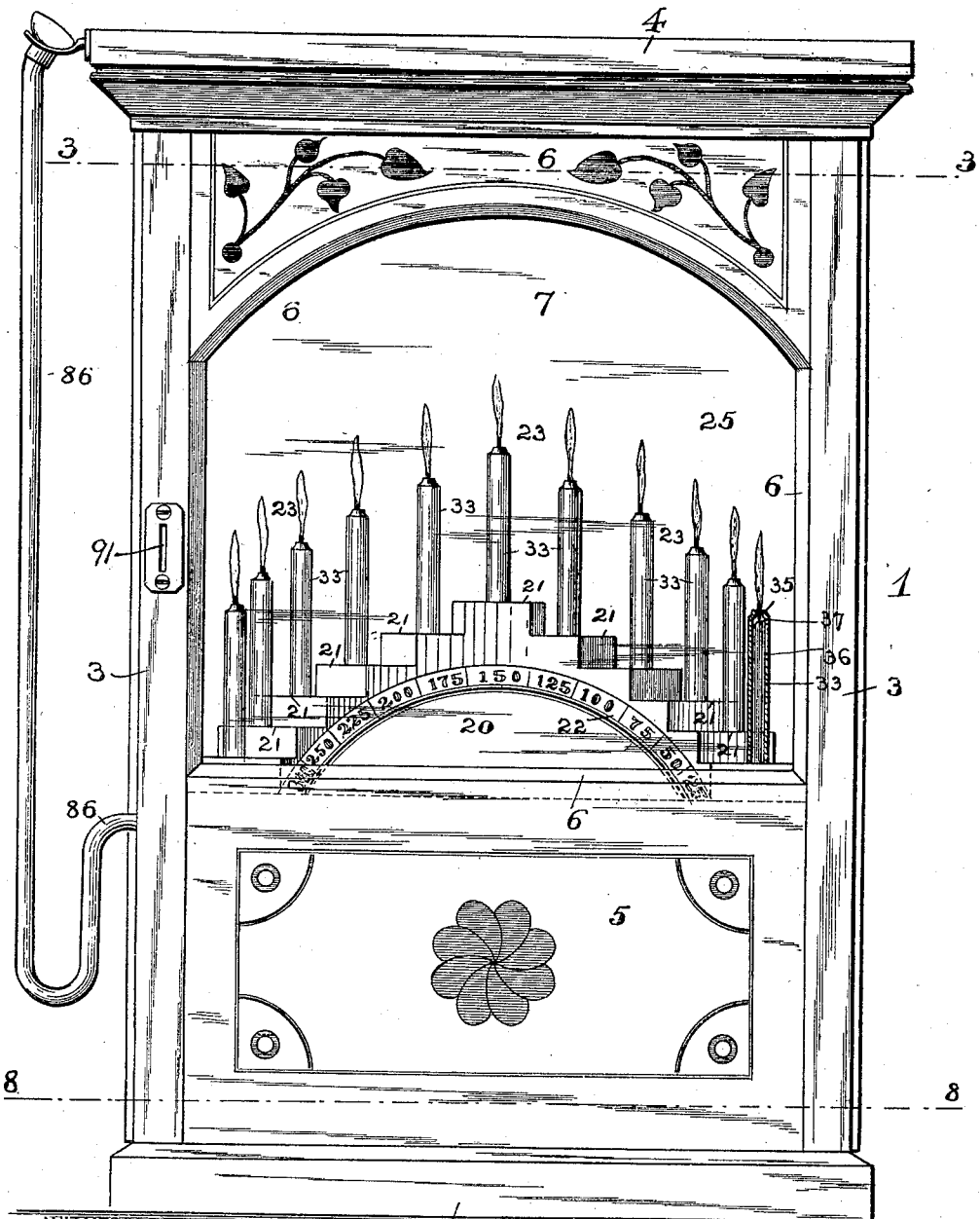

No. 701,130. Patented May 27, 1902.
M. BENEDICT.
APPARATUS FOR TESTING THE VOLUME OF AIR FROM THE LUNGS.
(Application filed July 23, 1901.)
(No Model.) 7 Sheets—Sheet 1.

WITNESSES:
Geo. D. Richards
E. Van Ness

INVENTOR:
MICHAEL BENEDICT,
BY
Fred'k C. Fraentzel,
ATTORNEY

No. 701,130. Patented May 27, 1902.
M. BENEDICT.
APPARATUS FOR TESTING THE VOLUME OF AIR FROM THE LUNGS.
(Application filed July 23, 1901.)
(No Model.) 7 Sheets—Sheet 2.

WITNESSES:
Geo. D. Richards
E. Van Ness.

INVENTOR:
MICHAEL BENEDICT
BY
Fred K. Fraentzel
ATTORNEY

No. 701,130.  
M. BENEDICT.  
APPARATUS FOR TESTING THE VOLUME OF AIR FROM THE LUNGS.  
(Application filed July 23, 1901.)  
Patented May 27, 1902.

(No Model.)  
7 Sheets—Sheet 3.

WITNESSES:  
Geo. A. Richards.  
E. Van Ness.

INVENTOR:  
MICHAEL BENEDICT,  
BY  
Fred'k C. Fraentzel,  
ATTORNEY

No. 701,130. Patented May 27, 1902.
M. BENEDICT.
APPARATUS FOR TESTING THE VOLUME OF AIR FROM THE LUNGS.
(Application filed July 23, 1901.)
(No Model.) 7 Sheets—Sheet 4.
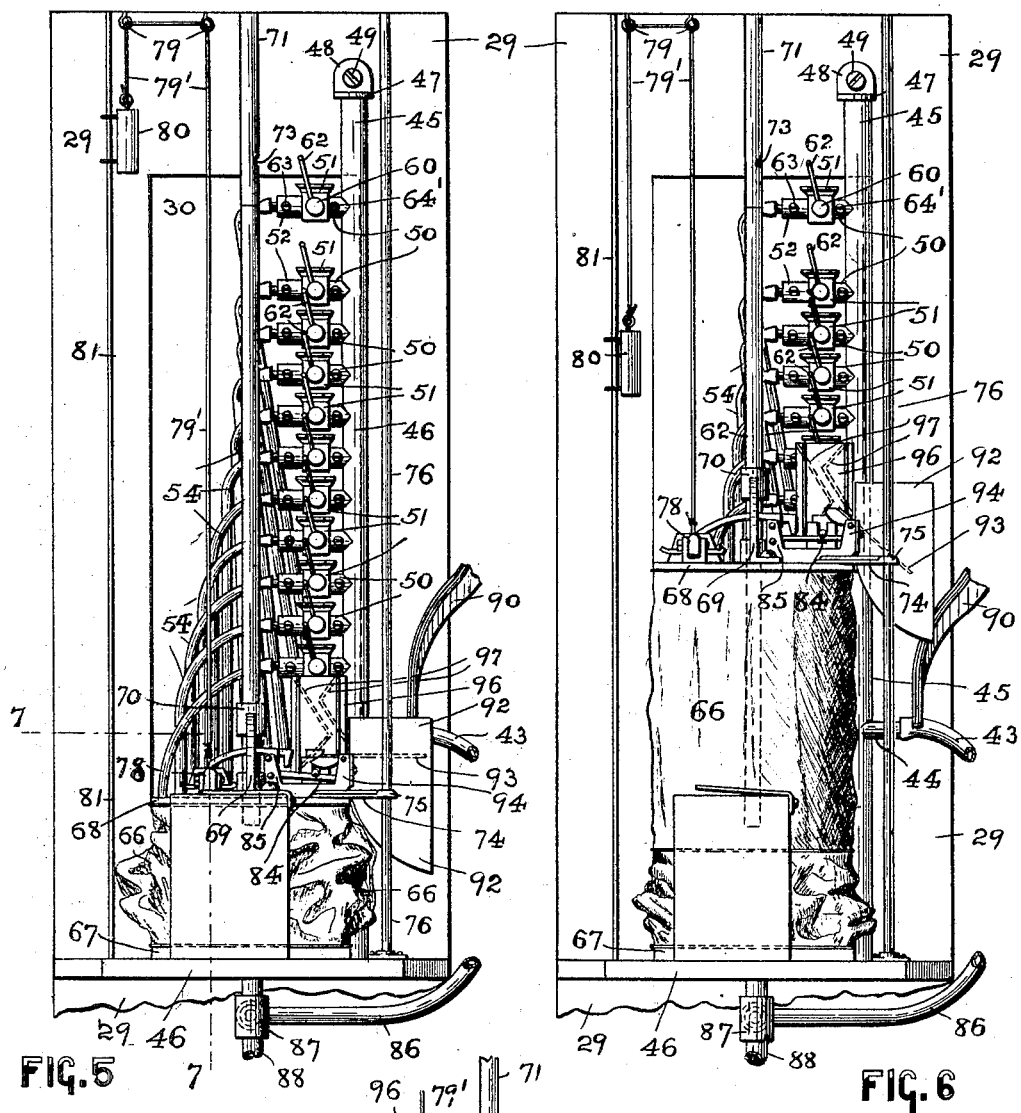
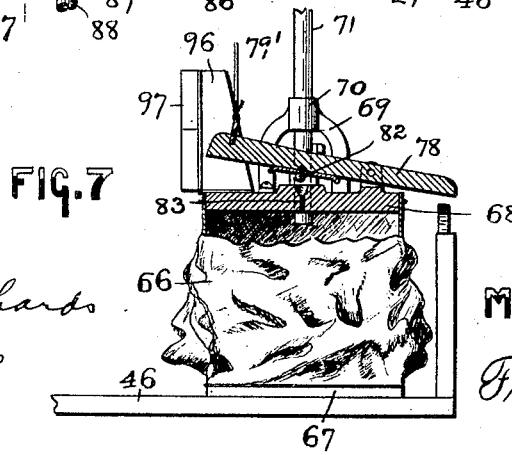
WITNESSES:
Geo. D. Richards
E. Van Ness
INVENTOR:
MICHAEL BENEDICT
BY
Fred L. C. Fraentzel
ATTORNEY No. 701,130. Patented May 27, 1902.
M. BENEDICT.
APPARATUS FOR TESTING THE VOLUME OF AIR FROM THE LUNGS.
(Application filed July 23, 1901.)
(No Model.) 7 Sheets—Sheet 5.

WITNESSES:
Geo. J. Richards
E. Van Ness.

INVENTOR:
MICHAEL BENEDICT,
BY
Fred L. Fraentzel,
ATTORNEY

No. 701,130. Patented May 27, 1902.
M. BENEDICT.
APPARATUS FOR TESTING THE VOLUME OF AIR FROM THE LUNGS.
(Application filed July 23, 1901.)
(No Model.) 7 Sheets—Sheet 6.

WITNESSES:
Geo. A. Richards
W. B. Fraentzel

INVENTOR:
MICHAEL BENEDICT,
BY
Fred'k C. Fraentzel,
ATTORNEY

No. 701,130. Patented May 27, 1902.
M. BENEDICT.
APPARATUS FOR TESTING THE VOLUME OF AIR FROM THE LUNGS.
(Application filed July 23, 1901.)
(No Model.) 7 Sheets—Sheet 7.
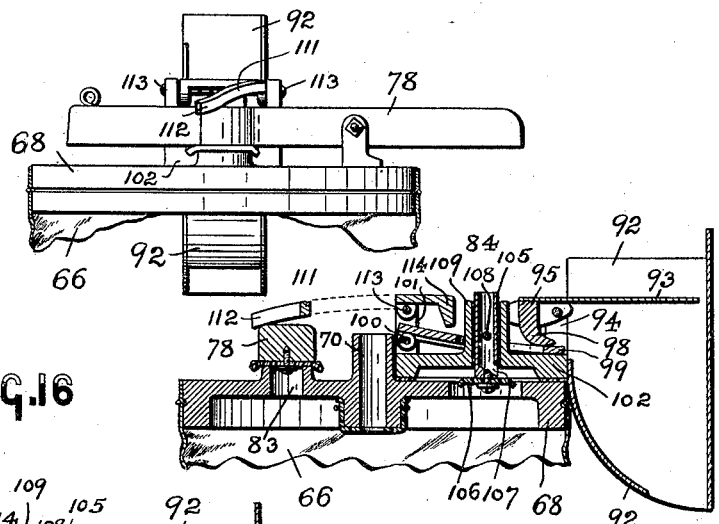
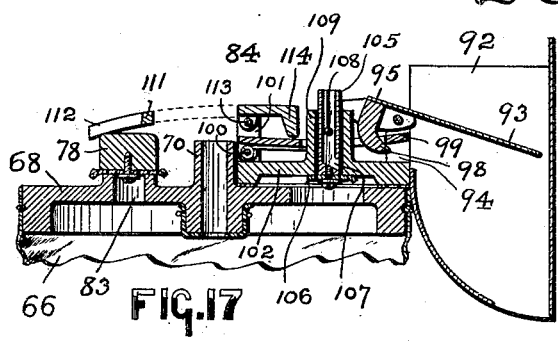
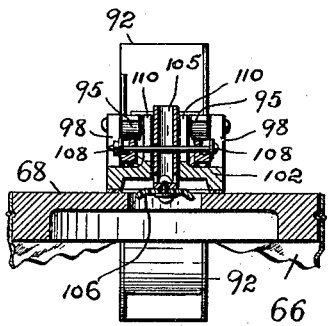
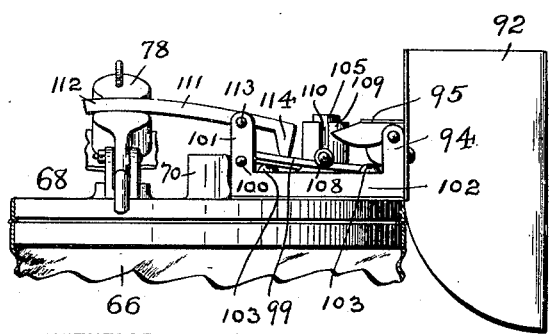
WITNESSES:
INVENTOR:
MICHAEL BENEDICT,
BY
Fred'k C. Fraentzel,
ATTORNEY

United States Patent Office.

MICHAEL BENEDICT, OF NEW YORK, N. Y.

APPARATUS FOR TESTING THE VOLUME OF AIR FROM THE LUNGS.

SPECIFICATION forming part of Letters Patent No. 701,130, dated May 27, 1902.

Application filed July 23, 1901. Serial No. 69,347. (No model.)

*To all whom it may concern:*

Be it known that I, MICHAEL BENEDICT, a citizen of the United States, residing at New York, in the county of New York and State of New York, have invented certain new and useful Improvements in Apparatus for Testing the Volume of the Air Blown from the Lungs; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The present invention has reference more particularly to a novel construction of machine or apparatus of the character hereinafter more fully set forth which is intended for accurately registering the lung-power of a person.

The arrangement of the parts and operations of the mechanism of the machine, which is preferably used with coin-controlled apparatus, are such that after a person has deposited a coin in the coin-chute of the apparatus certain mechanism is released that it can be actuated by the air from the lungs of a person blowing into an air-conducting tube connected with the apparatus, the said mechanism being arranged and operating in such a manner that to all appearances one or more lighted gas-flames are extinguished by reducing the flame or flames and causing such reduced flame or flames to burn within a tubular casing arranged about each gas-jet, and hence out of sight of the person blowing, all of which will be hereinafter more particularly set forth.

The principal object of this invention therefore is to provide an efficient and operative device to be used as a lung-tester which shall be of a simple and inexpensive construction.

A further object of this invention is to provide an apparatus of the character above specified in which the several gas-jets which have been reduced by a person blowing into the machine shall immediately and automatically obtain their original size and burn brightly at the top of the jet as soon as the person ceases the blowing operation.

The invention therefore consists in the novel construction of lung-testing apparatus to be hereinafter fully described, and, furthermore, the novelty of my invention resides in the construction, combinations, and arrangements of the devices disclosed, all of which will be set forth in the following specification and then finally embodied in the clauses of the claim, which form a part of the said specification.

The invention is clearly illustrated in the accompanying drawings, in which—

Figure 2:
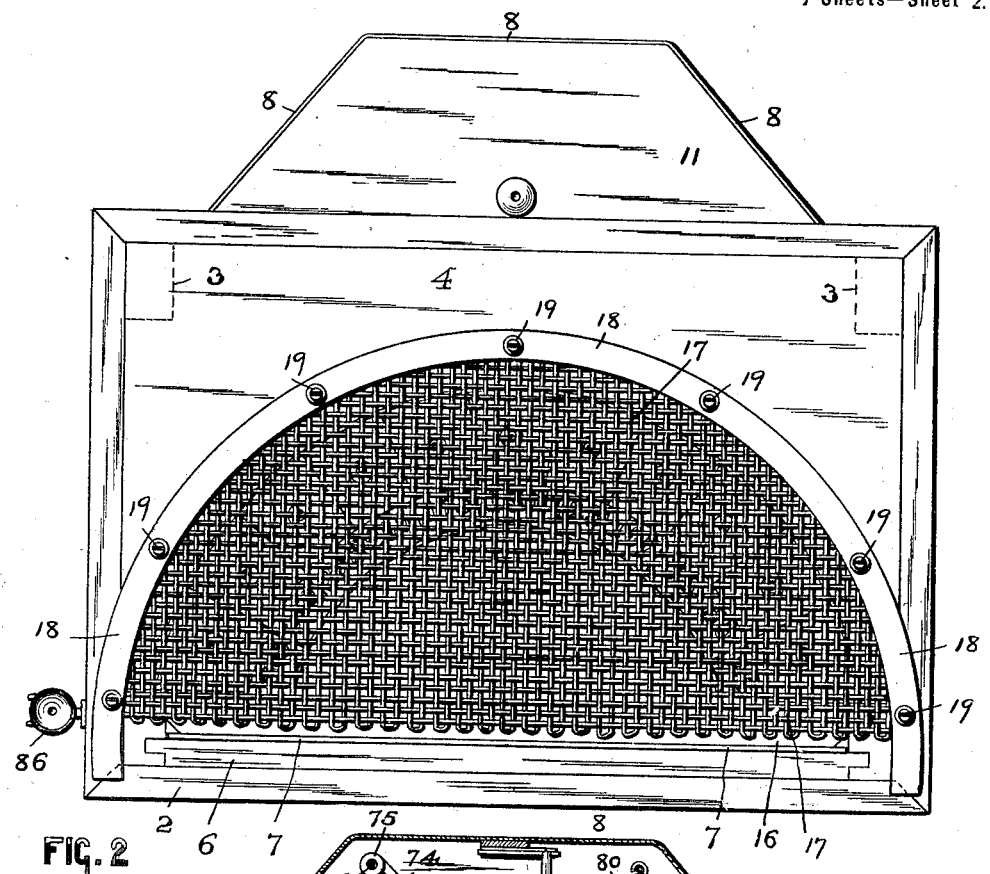
Figure 3:
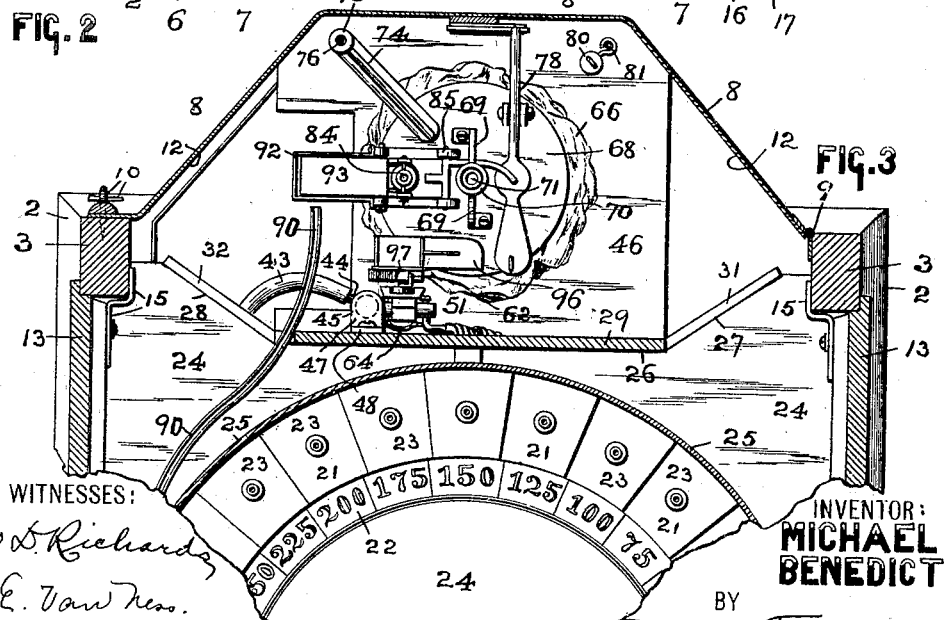
Figure 4:
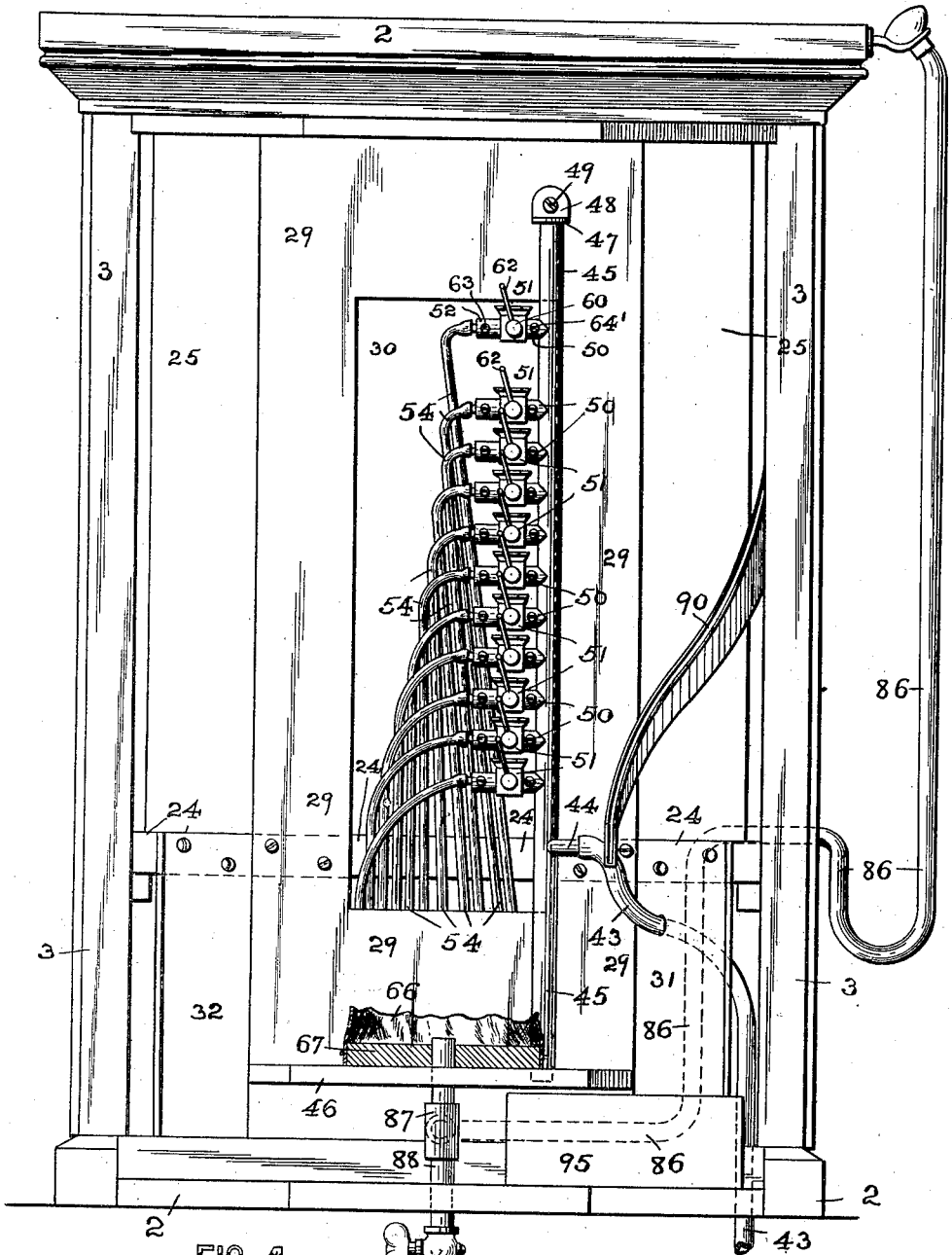
Figure 8:
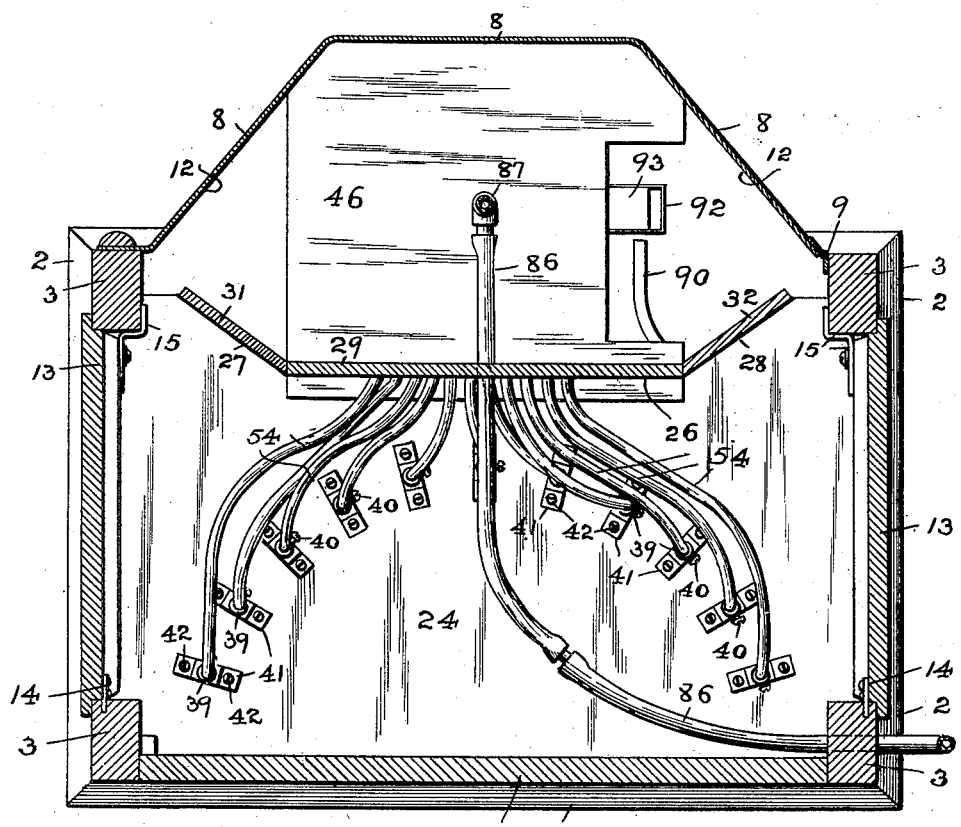
Figure 9:
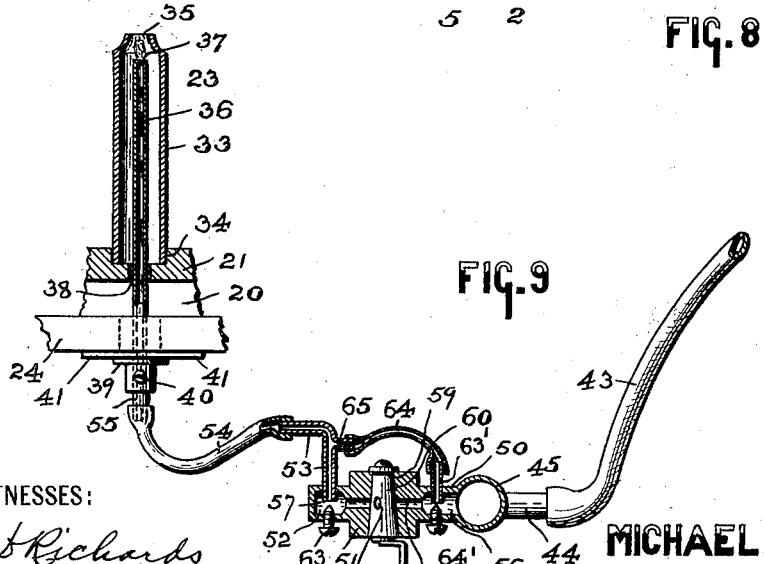
Figure 11:
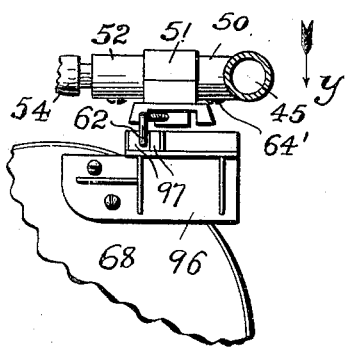
Figure 10:
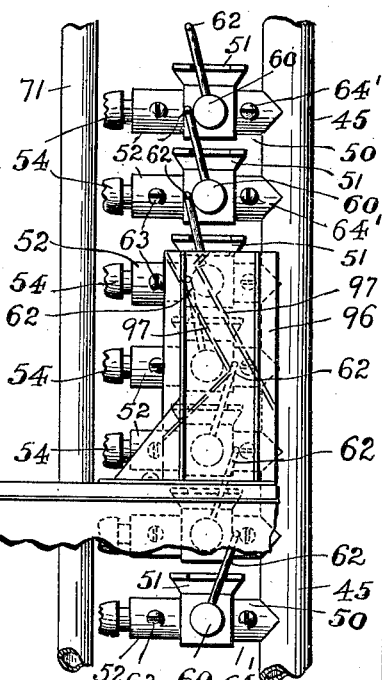
Figure 12:
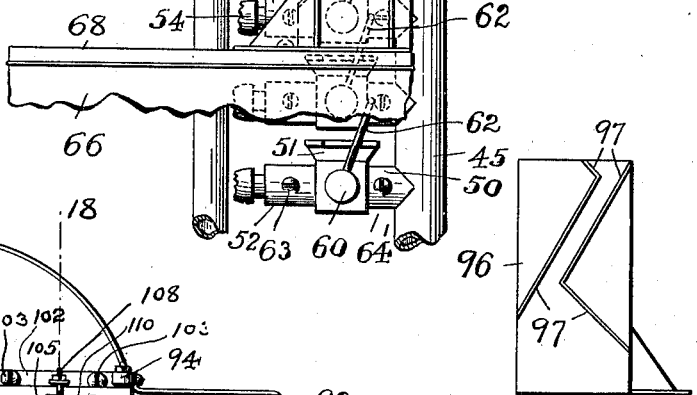
Figure 13:
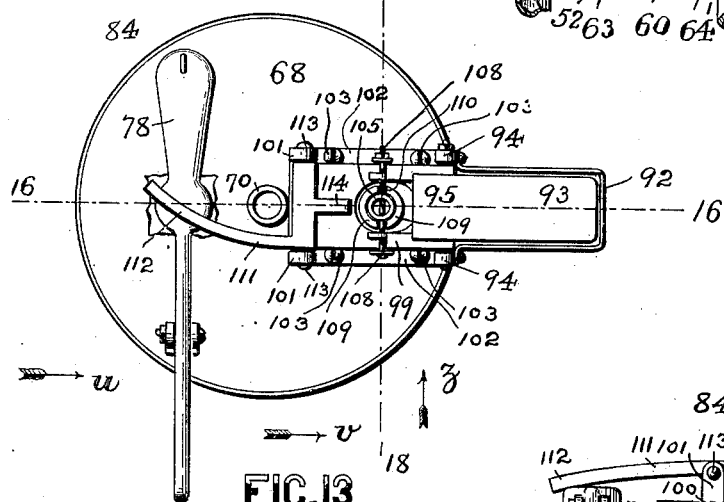
Figure 14:
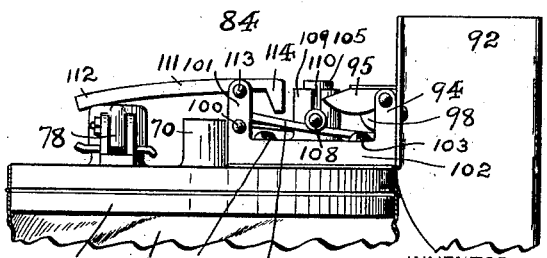

Figure 1 is a front view of an apparatus in which is embodied the various features of my present invention, and Fig. 2 is a top or plan view of the same. Fig. 3 is a horizontal section of the apparatus, said section being taken on line 3 3 in Fig. 1 looking in an upward direction, several portions of the apparatus being represented as being broken away. Fig. 4 is a rear view of the apparatus with the back of the inclosing casing removed, the said view representing one general arrangement of operating-cocks by means of which the flow of gas to the various burners can be shut off, and a controlling-bellows by means of which these cocks are controlled being omitted in this view. Fig. 5 is a rear view of a portion of the framework of the apparatus, illustrating the general arrangement of the bellows before it is blown up and the gas-conveying pipes and normally open cocks, which are to be closed by the upward movement of the said bellows when the same has been expanded by forcing air from the lungs of a person into the bellows. Fig. 6 is a similar view of the same parts which are represented in said Fig. 5, showing the bellows in its partially blown up and raised position, having closed some of the gas-cocks during its upward movement. Fig. 7 is a vertical representation of the bellows, taken on line 7 7 in Fig. 5 of the drawings, just before the bellows has resumed its initial and normally inoperative position, with a valve-controlling lever raised to permit the escape of the air from the bellows during its descent after a person has ceased to blow air into said bellows. Fig. 8 is a horizontal section of the lower portion of the apparatus, said section being taken on line 8 8 in Fig. 1 when looking in the direction of the arrow $y$ in said figure. Fig. 9 is a diagrammatical representation of one of the gas burners or jets, the same being represented in vertical section, one of the gas-cocks, the same being represented in horizontal section and closed, and the pipe connections between the said burner and gas-cock. Fig. 10 is a rear face view, on an enlarged scale, of a part of the bellows frame or head, the gas-conveying pipe, and some of the gas-cocks connected with said pipe to illustrate more clearly the manner of actuating the conical valve-plugs of the several gas-cocks. Fig. 11 is a top view of some of the parts represented in said Fig. 10 with the main portion of the bellows frame or head omitted, and Fig. 12 is a face view looking in the direction of the arrow in Fig. 11 of a bracket provided with zigzag ribs for actuating certain crank-arms connected with the conical valve-plugs of the gas-cocks. Fig. 13 is a top or plan view, on an enlarged scale, of the bellows frame or head and a valve-controlling mechanism connected therewith. Fig. 14 is a side view of the said parts looking in the direction of the arrow $z$ in said Fig. 13, and Fig. 15 is a similar view of the same parts looking in the direction of the arrow $u$ in said Fig. 13. Fig. 16 is a vertical cross-section, taken on line 16 16 in said Fig. 13, illustrating the several parts of the mechanism in their normally inactive positions; and Fig. 17 is a similar view of the same mechanism, representing the the parts thereof in their operated positions. Fig. 18 is a vertical cross-section, taken on line 18 18 in said Fig. 13, looking in the direction of the arrow $v$; and Fig. 19 is a side view of the mechanism similar to Fig. 14, but representing the parts of the mechanism in their operative positions.

Similar characters of reference are employed in all of the said above-described views to indicate corresponding parts.

The apparatus consists, essentially, of a suitable box or casing 1, which can be ornamented as desired and is of the general shape indicated, although it will be clearly understood that the shape of the casing and its ornamentation may be varied whenever found necessary. In the present form of casing the same comprises a suitable base 2 of a general rectangular configuration, four standards or posts 3 at or near the respective corners of the base, and a suitable top 4, secured upon the upper ends of the said standards or posts 3. The front of the said casing comprises a solid piece 5, suitably secured between the lower portions of the two front standards or posts 3, and directly above the said solid piece 5 and suitably secured between the said posts 3 is frame 6, which is provided with a glass 7, through which the gas-jets and the force-indicating scale are fully exposed to view. As will be seen from an inspection of Figs. 3 and 8, the space between the two rear standards or posts 3 is closed by means of a rearwardly-extending shell 8, the shell being pivotally secured to one of said rear posts 3 by means of hinges 9 and being locked to the other rear post 3 by means of a staple and pin 10, as clearly represented in Fig. 3 of the drawings. When the said shell 8 is in its closed position, then its upper edge fits against a rearwardly-extending part 11 of the top 4 of the casing 1, while its lower edge s simply fitted against a correspondingly-formed rearwardly-extending part 12 of the base 2. The two sides of the apparatus are indicated by the reference-numbers 13, the sides being removably secured between the posts 3 by means of the fixed lugs 14 and the pivotally-arranged holding-catches 15, as clearly illustrated in Fig. 8.

A represented in Fig. 2 of the drawings, the top 4 of the casing or box 1 is formed with a suitable opening 16, preferably of the shape shown, a screen or netting 17 being secured above the said opening 16 by means of a frame 18, which is secured to said cover 2 with screws 19. The purpose of this opening in the cover 2 is to provide for the proper ventilation and the escape of the heat from the various gas-burners within the said casing. The screen or netting also serves as a covering for the open part of top 2 of the casing to prevent the tampering with the lighted gas jets or burners. These gas jets or burners, of which there may be any desired number, are usually arranged on a semicircular platform 20, the platform being preferably formed with the steps 21, which are arranged in the present case in such a manner that the central gas jet or burner will be the highest and those at the extreme opposite ends of the said platform will be the lowest. Usually I employ eleven gas jets or burners and the suitable connections for the same, and upon the convex front of the said platform I have arranged a numbered index 22, the numbers thereon being placed opposite each step 21, provided with the gas jets or burners 23, substantially as illustrated in Fig. 1 of the drawings. The said platform 20, as will be seen from an inspection of Fig. 3 of the drawings, is arranged upon a horizontal partition 24 and directly in front of curved vertical wall or partition 25, which may be polished metal or a mirror, whereby the general appearance of the apparatus is greatly enhanced. As will be seen from Figs. 3, 4, and 8, the rear edge of the said horizontal partition 24 is cut out, so as to form the angularly-arranged edges 26, 27, and 28. Suitably secured against the middle edge 26 and extending from the base to the top of the apparatus is a vertical partition 29, which is provided with a suitably-formed opening 30, as shown, and extending from the base 2 of the apparatus to the two edge portions 27 and 28 and suitably secured thereto are two short vertical partitions 31 and 32. From an inspection more especially of Fig. 9 it will be seen that each gas-burner 23 consists, essentially, of an outer tube 33, which may be made to represent a candle, as shown, the said tube having its lower end portion resting in a recess 34 in a step 21 of the platform 20 and being provided at its upper end with an opening 35. Within each outer tube 33 is an inner tube 36, the said tube 36 being provided in its upper end with a small gas-outlet 37 and its lower portion extending through an opening 38 in the step 21. The extreme lower portion of each gas tube or pipe 36 passes in a downward direction through a suitable fitting 39, in which this portion of the tube or pipe 36 is secured by means of a set-screw 40 or any other suitable fastening means. Each fitting 39 is formed with perforated ears 41 and is secured in position against the under surface of the horizontal partition 24 by means of screws or pins 42, as represented in Fig. 8 of the drawings.

The main gas-supply to the various gas-burners 23 consists, essentially, of a main gas tube or pipe 43, which is preferably a piece of flexible tubing, the end of which is attached within the casing of the apparatus to a fitting 44, connected with a vertical stand-pipe 45. The lower closed end of this pipe 45 is secured to a shelf 46, extending rearwardly from the vertical partition 29, as shown, and the upper end of said stand-pipe 45 is closed by means of a cap 47, having a perforated flange 48 and a screw 49 for securing the upper end of said stand-pipe 45 against the back of the vertical partition 29. In one side of the said stand-pipe 45 are a number of tubular outlets 50, which correspond in number to the number of gas-burners 23 employed in the apparatus. The said outlets 50 are each provided with a suitably-constructed gas-cock 51 for controlling the supply of the illuminating-gas to a second set of gas-outlets 52, with each of which is connected a gas-conveying pipe 53, connected by means of flexible tubing 54 or in any other suitable manner with the extreme lower ends 55 of the respective gas pipes or tubes 36 of gas-burners 23.

As clearly illustrated in Fig. 9, the stand-pipe 45, the several cocks 51, and the respective outlets 50 and 52 are usually cast in one integral piece; but it will be understood that these several parts may be separately made and then connected in the usual manner commonly employed in the art of gas-fitting.

As shown, the inner tubular or chambered portions 56 of the outlets 50 and the inner tubular or chambered portions 57 of the outlets 52 are in communication with a straight duct or passage-way 58 of the gas-cocks 51, each cock being formed with a cone-shaped seat 59 and correspondingly-formed valve 60, which has a lateral duct 61 extending through the same from side to side. Thus when the said lateral duct 61 is in direct communication with the duct or passage-way of the cock 51 a full supply of gas flows through the respective pipes and connections, which when ignited burns with a large and bright flame at each burner 23, as represented in Fig. 1 of the drawings. The cone-shaped valve 60 is operated, in the manner hereinafter more fully set forth, by means of a crank-arm 62. A pointed set-screw 63 may also be employed with each outlet 52, which can be set by means of a screw-driver, to regulate the main supply of gas which is to be ignited at each burner. In addition to these several parts just described each gas-outlet 50 has an auxiliary outlet-pipe 63' and an adjusting set-screw 64', directly opposite the inner end of the pipe 63', which can be set to permit a minimum supply of gas to pass into the pipes 63', connected with the respective cocks 51, and then pass through the ducts 64 into nipples or connections 65 in the pipes 53, as clearly illustrated in Fig. 9 of the drawings. In this manner when the main supply of gas has been arrested through the closing of the cock 51, in the manner to be hereinafter fully described, the large flame at the burner 23 is reduced by the minimum charge of gas still flowing to the burner, owing to this arrangement of the parts 63, 64, and 65, and will burn with a small flame directly within and below the upper edge of the outer tube 33 of the burner, and to all appearances the gas-flame has been entirely extinguished. As soon as the gas-cock 51 has again been opened the maximum supply of gas is furnished at the burner and the gas will again burn with the larger flame, as indicated in said Fig. 1 of the drawings.

Having thus described the general arrangement and construction of the gas-burners, the connecting-pipes, and the intermediately-arranged gas-cocks, I will now endeavor to set forth the arrangement and construction of the mechanism for successively closing and opening the respective gas-cocks when a person blows air from his or her lungs into a bellows connected with the apparatus.

The bellows consists, essentially, of a bag 66, made of a suitable fabric, and the two heads 67 and 68. The said bellows 66 has its lower head 67 suitably secured upon the shelf 46, while its upper head 68 is provided with bracket 69 and a bearing 70. This bearing 70 is placed about a vertical tube 71, which is closed at the top and has its lower and open end extending through the head 68 into the interior of the bellows 66, as indicated in Figs. 5, 6, and 7. Thus when the bellows is expanded the said upper head 68 moves vertically upon the said tube 71, as will be clearly evident. The upper end 72 of the said tube, it will be understood, is of necessity closed, but is provided with a small vent-hole 73. Extending from the one side of the said upper head 68 is an arm 74, which is provided with an eye 75, slidably fitted upon a guide-rod 76, as clearly shown in Figs. 5 and 6, and 79' indicates a flexible connection which is attached at its lower end to a pivoted valve-lever 78 upon the said head 68, and has its other end portion passing through suitably-arranged eyes 79, as shown, and provided with a counterbalance 80, which can be made to slide in a downward or upward direction upon a guide-rod 81 during the upward or downward movements of the upper head 68 of the bellows. When the said bellows is at its lowest point and also during the upward movement of the said head 68, a valve-disk 82 on the under side of the said lever closes an air-duct 83 in the said head 68. In the said upper head 68 there is another opening provided with a normally open valve mechanism 84, which is pivotally arranged in a bracket 85, as shown. The valve construction which is controlled by this mechanism is not in itself new, and is therefore set forth merely in a general way. As has been stated, under normal conditions this valve mechanism is open, and when air is forced from the mouth-tube 86 and the fitting 87 into the bellows this air will escape through the said open valve mechanism without raising the bellows. Connected with the said fitting 87 there is an outlet-tube 88 and a cock 89 for drawing off any condensation from the said bellows. When the apparatus is in use, this cock 89 is closed. To operate the valve mechanism 84, and thereby close the normally open valve thereof, I have provided the apparatus with a coin-chute 90, which leads from slot 91 in the front of the apparatus to a point within the apparatus directly at the side of a receiver 92. When a coin is deposited in the said slot 91, it passes down the said coin-chute 90 and is dropped upon a lever 93, pivoted upon a bracket 94, whereby this lever moves from its horizontally-dotted position (indicated in Fig. 5) and the position represented in Fig. 16 to the inclined position dotted in outline in Fig. 6 and also indicated in Fig. 17 of the drawings. At the same time the weighted end 95 in the form of a downwardly-extending stud or finger 98 (see Figs. 16 and 17) is raised sufficiently to permit a spring-actuated bar or plate 99, which is pivotally secured upon a pin 100 in the bearing-posts 101, to assume the raised position indicated in said Fig. 17. In the meantime the deposited coin will have passed from the lever 93 in the receiver 92 into a proper receptacle ordinarily placed beneath said receiver.

The hereinabove-mentioned bearing posts or brackets 94 and 101 form parts of a suitable frame or plate 102, which is suitably secured upon the bellows-head 68 by means of screws 103 or in any other suitable manner. The said head 68 is made with an opening 104, in which is movably arranged the lower and closed end of a tube 105, provided on said closed end with a flexible washer or disk 106. The said tube 105 is provided with an opening 107, and by means of a pin 108 it is capable of a sliding motion within a tubular hub 109 of said frame 102. The projecting and free ends of the said pin 108 also rest directly upon the upper surface of the bar or plate 99, as clearly shown. Thus it will be evident from an inspection of Fig. 16 that when the parts are in the positions indicated in said figure an unobstructed air-passage is formed between the bellows 66 and the tube 105, and any blowing into the mouthpiece of the tube 86 will have no effect upon the bellows. When, however, the lever 93 has been tilted by a deposited coin, then the spring-actuated bar or plate 99 is released, and said bar or plate 99 acts against the projecting ends of the said pin 108, thereby raising the pin in the slots 110 of the hub 109 and with said pin raising the said tube 105 and bringing the flexible washer or disk 106 directly against the under surface of the frame or plate 102, as clearly indicated in Fig. 17. The inlet or opening 107 into said tube 105 is thus closed. The air from the lungs of a person blowing into the mouth-tube 86 is now imprisoned in the bag of the bellows, whereby the same expands and the upper head 68 moves in an upward direction. At one side of the said head is a bracket 96, which has a pair of zigzag ribs 97, as indicated in the dotted outline in said Figs. 5 and 6 or as represented in Figs. 10, 11, and 12, with which the crank-arms 62 of the cone-shaped valves 60 of the several gas-cocks 51 are brought in sliding contact as the head 68 of the bellows moves upwardly upon the tube 71 and by means of which any number of gas-cocks can be closed during the upward movement of the upper head 68 of the bellows, according to the power of the air being forced into the bellows. The manner of opening and closing the respective gas-cocks will be more clearly understood from an inspection of Fig. 10 of the drawings. During the upward movement of the bellows-head 68 each crank-arm 62 is successively and slidably engaged by the zigzag rib 97 at the left side of the bracket 96, whereby each cone-shaped valve-plug 60 is operated, the valves being actuated in succession from the lowest valve up to shut off the main flow of the gas at each gas-cock, as will be clearly understood from an inspection of the parts as represented in said Fig. 10 of the drawings. During the downward movement of the said head 68 and the bracket 96 when the person has ceased blowing the crank-arms 62 of the closed valves of the gas-cocks are successively brought into sliding engagement with another zigzag rib 97 at the right of the bracket, whereby the arms 62 are moved from the right toward the left, and each cone valve or plug of the previously-closed cock is again actuated to permit of the passage of a full supply of the gas through the respective gas-cocks. When the person ceases to blow, then the tendency of the weight 80 is to cause the lever 78 to assume the position indicated in Figs. 7 and 19, whereby the said lever is raised from its normally closing position upon valve-duct 83 which is thus opened, and the air within the bellows is allowed to escape through the said duct. At the same time the head 68 is moving downwardly, whereby the zigzag ribs 97 are again brought against the crank-arms 62 of the closed gas-cocks 51, and the valves thereof are opened. A full supply of gas is then again admitted to each burner 33, and the small flame at each burner is again restored to its original size.

It will thus be seen that I have devised an operative machine for testing the blowing capacity of the lungs of a person, the operation and construction of the parts being such that one or more gas-flames are successively reduced to indicate the blowing power of a person and the flames at the respective gas-burners being automatically restored to their original size as soon as the person ceases to blow into the mouth-tube connected with the apparatus.

I am aware that many changes may be made in the various arrangements of the devices, as well as in the arrangements and combinations of the parts thereof, without departing from the scope of this invention. Hence I do not limit my invention to the exact arrangements and combinations of the devices and their parts as described in the accompanying specification and as illustrated in the drawings, nor do I confine myself to the exact details of the construction of any of the said parts.

Having thus described my invention, what I claim is—

1. In an apparatus for testing the volume of the air blown from the lungs of a person, the combination, with a casing, of a series of gas-burners, gas-conveying pipes leading to the said burners, a series of gas-cocks, a bellows adapted to be expanded by forcing air into the same, and means for successively closing the said gas-cocks during the ascent of the bellows and opening the closed gas-cocks during the descent of the bellows, substantially as and for the purposes set forth.

2. In an apparatus for testing the volume of the air blown from the lungs of a person, the combination, with a casing, of a series of gas-burners, a stand-pipe, means for conducting gas into said stand-pipe, a series of gas-cocks connected with the said stand-pipe, a gas-conveying pipe between each gas-cock and each gas-burner, and means for successively closing and opening the said gas-cocks, substantially as and for the purposes set forth.

3. In an apparatus for testing the volume of the air blown from the lungs of a person, the combination, with a casing, of a series of gas-burners, a stand-pipe, a means for conducting gas into said stand-pipe, a series of gas-cocks connected with the said stand-pipe, a gas-conveying pipe between each gas-cock and each gas-burner, a bellows adapted to be expanded by forcing air into the same, and means for successively closing the said gas-cocks during the ascent of the bellows, and opening the closed gas-cocks during the descent of the bellows, substantially as and for the purposes set forth.

4. In an apparatus for testing the volume of the air blown from the lungs of a person, the combination, with a casing, of a series of gas-burners, gas-conveying pipes leading to the said burners, a series of gas-cocks, an oscillating valve in each gas-cock provided with a forwardly-extending arm, a bellows adapted to be expanded by forcing air into the same, and means for successively engaging the forwardly-extending arms and thereby actuating the valves of said gas-cocks, consisting, of a bracket having ribs adapted to engage with the said arms for closing or opening the said valves, substantially as and for the purposes set forth.

5. In an apparatus for testing the volume of the air blown from the lungs of a person, the combination, with a casing, of a series of gas-burners, gas-conveying pipes leading to the said burners, a stand-pipe, means for conducting gas into said stand-pipe, a series of gas-cocks connected with said stand-pipe, a gas-conveying pipe between each gas-cock and each gas-burner, an oscillating valve in each gas-cock provided with a forwardly-extending arm, and means arranged and constructed to successively engage the said arms, and actuate the oscillating valves of the gas-cocks, substantially as and for the purposes set forth.

6. In an apparatus for testing the volume of the air blown from the lungs of a person, the combination, with a casing, of a series of gas-burners, gas-conveying pipes leading to the said burners, a stand-pipe, means for conducting gas into said stand-pipe, a series of gas-cocks connected with said stand-pipe, a gas-conveying pipe between each gas-cock and each gas-burner, an oscillating valve in each gas-cock provided with a forwardly-extending arm, a bellows adapted to be expanded by forcing air into the same, and means for successively engaging the forwardly-extending arms and thereby actuating the valves of said gas-cocks, consisting of a bracket having ribs adapted to engage with the said arms for closing or opening the said valves, substantially as and for the purposes set forth.

7. In an apparatus for testing the volume of the air blown from the lungs of a person, the combination, with a casing, of a series of gas-burners, each burner comprising an inner gas-burning tube and an outer tube, gas-conveying pipes leading to the said inner gas-burning tubes, a series of gas-cocks, each cock being provided with an oscillating valve for admitting a full supply of gas to the inner gas-burning tube, means for closing the said gas-cocks, and an auxiliary gas-tube connected with said gas-conveying pipes and leading around each gas-cock for providing each burner with a constant but limited supply of gas, substantially as and for the purposes set forth.

8. In an apparatus for testing the volume of the air blown from the lungs of a person, the combination, with a casing, of a series of gas-burners, each burner comprising an inner gas-burning tube, gas-conveying pipes leading to the said inner gas-burning tubes, a series of gas-cocks, each cock being provided with an oscillating valve for admitting a full supply of gas to the inner gas-burning tube, means for closing the said gas-cocks, and an auxiliary gas-tube connected with said gas-conveying pipes and leading around each gas-cock for providing each burner with a constant but limited supply of gas, and a bellows adapted to be expanded by forcing air into the same, the said bellows being arranged to actuate the said closing means of said gas-cocks, and successively closing the valves of said cocks during the ascent of the bellows and opening said valves during the descent of the said bellows, substantially as and for the purposes set forth.

9. In an apparatus for testing the volume of the air blown from the lungs of a person, the combination, with a casing, of a series of gas-burners, each burner comprising an inner gas-burning tube and an outer tube, a stand-pipe, means for conducting gas into said stand-pipe, a series of gas-cocks connected with said stand-pipe, a gas-conveying pipe between each gas-cock and each inner gas-burning tube, an oscillating valve in each gas-cock for admitting a full supply of gas to the inner gas-burning tube, means for closing the said gas-cocks, and auxiliary gas-tubes connected with the said stand-pipe and the said gas-pipes which lead to the said inner gas-burning tubes, the said auxiliary gas-tubes leading directly around the said gas-cocks, for providing each burner with a constant but limited supply of gas, substantially as and for the purposes set forth.

10. In an apparatus for testing the volume of the air blown from the lungs of a person, the combination, with a casing, of a series of gas-burners, each burner comprising an inner gas-burning tube, a stand-pipe, means for conducting gas into said stand-pipe, a series of gas-cocks connected with said stand-pipe, a gas-conveying pipe between each gas-cock and each inner gas-burning tube, an oscillating valve in each gas-cock for admitting a full supply of gas to the inner gas-burning tube, means for closing the said gas-cocks, and auxiliary gas-tubes connected with the said stand-pipe and the said gas-pipes which lead to the said inner gas-burning tubes, the said auxiliary gas-tubes leading directly around the said gas-cocks, for providing each burner with a constant but limited supply of gas, and a bellows adapted to be expanded by forcing air into the same, the said bellows being arranged to actuate the said closing means of said gas-cocks, and successively closing the valves of said cocks during the ascent of the bellows and opening the said valves during the descent of the said bellows, substantially as and for the purposes set forth.

11. In an apparatus for testing the volume of the air blown from the lungs of a person, the combination, with a casing of a bellows adapted to be expanded, a series of gas-burners, and an intermediately-arranged mechanism between said bellows and the burners for successively reducing the gas-flames at the said burners, and then restoring said flames to their original size, substantially as and for the purposes set forth.

12. In an apparatus for testing the volume of the air blown from the lungs of a person, the combination, with a casing, of a bellows adapted to be expanded, a bracket on said bellows, provided with ribs, a series of gas-burners, and gas-cocks arranged in gas-conveying pipes connected with said burners, and means on said gas-cocks with which said ribs on said bracket engage for closing and opening the said gas-cocks, substantially as and for the purposes set forth.

In testimony that I claim the invention set forth above I have hereunto set my hand this 19th day of July, 1901.

MICHAEL BENEDICT.

Witnesses:
   FREDK. C. FRAENTZEL,
   GEO. D. RICHARDS.